United States Patent
Jung et al.

(10) Patent No.: US 9,391,332 B2
(45) Date of Patent: Jul. 12, 2016

(54) FLUID FLOW PLATE ASSEMBLIES FOR USE IN FUEL CELLS HAVING FLOW CHANNELS WITH SUBSTANTIALLY SAME LENGTH

(75) Inventors: Shiqah-Ping Jung, Taoyuan County (TW); Huan-Ruei Shiu, Penghu County (TW); Chi-Chang Chen, Changhua County (TW); WenChen Chang, Hsinchu County (TW); Fanghei Tsau, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/098,144

(22) Filed: Apr. 29, 2011

(65) Prior Publication Data

US 2011/0256462 A1    Oct. 20, 2011

Related U.S. Application Data (60) Provisional application No. 61/428,969, filed on Dec. 31, 2010.

(51) Int. Cl.
*H01M 8/24* (2006.01)
*H01M 8/04* (2006.01)
*H01M 8/02* (2016.01)

(52) U.S. Cl.
CPC .......... *H01M 8/0258* (2013.01); *H01M 8/0267* (2013.01); *H01M 8/242* (2013.01); *H01M 8/245* (2013.01); *Y02E 60/50* (2013.01)

(58) Field of Classification Search
CPC .................................................. H01M 8/0267
See application file for complete search history.

(56) References Cited

U.S. PATENT DOCUMENTS 6,406,809 B1 * 6/2002 Fujii et al. ..................... 429/434
7,014,939 B2    3/2006 Suenaga et al.
(Continued)

FOREIGN PATENT DOCUMENTS

CN    1650458 A    8/2005
CN    101872867 A    10/2010
(Continued)

OTHER PUBLICATIONS

Kai Feng, Yao Shen, Jianming Mai, Dongan Liu, and Xun Cai, An investigation into nickel implanted 316L stainless steel as a bipolar plate for PEM fuel cell, Journal of Power Sources, vol. 182, Issue 1, Apr. 18, 2008, pp. 145-152, Shanghai Jiao Tong University, Shanghai 200240, PR China.
(Continued)

*Primary Examiner* — Barbara Gilliam
*Assistant Examiner* — Stephan Essex
(74) *Attorney, Agent, or Firm* — Finnegan, Henderson, Farabow, Garrett & Dunner LLP (57) ABSTRACT

A fluid flow plate for fuel cells may include a first surface and a second surface. The first surface has a first fluid inlet for receiving a first fluid, a plurality of first flow channels extending substantially along a first direction for transporting the first fluid, and a first fluid outlet for releasing the first fluid. The second surface having a second fluid inlet for receiving a second fluid, a plurality of second flow channels extending substantially along the first direction for transporting the second fluid, and a second fluid outlet for releasing the second fluid. The first fluid inlet and the second fluid outlet each is located near a first side of the fluid flow plate, and the first fluid outlet and second fluid inlet each is located near a second side of the fluid flow plate. The second side of the fluid flow plate is opposite to its first side. Each of the first and second flow channels has substantially the same length.

14 Claims, 8 Drawing Sheets

(56) References Cited

U.S. PATENT DOCUMENTS

| | | |
|---|---|---|
| 7,195,837 B2 | 3/2007 | Suzuki et al. |
| 7,291,414 B2 | 11/2007 | Goebel et al. |
| 7,318,973 B2 | 1/2008 | Rock et al. |
| 7,459,227 B2 | 12/2008 | Rock et al. |
| 7,531,265 B2 | 5/2009 | Sugiura et al. |
| 7,611,788 B2 | 11/2009 | Kikuchi et al. |
| 7,687,182 B2 | 3/2010 | Goebel et al. |
| 7,695,845 B2 | 4/2010 | Sugita et al. |
| 7,781,087 B2 | 8/2010 | Rock et al. |
| 7,820,315 B2 | 10/2010 | Kikuchi et al. |
| 2003/0203260 A1 | 10/2003 | Lee |
| 2004/0038114 A1* | 2/2004 | Wariishi et al. ............ 429/38 |

FOREIGN PATENT DOCUMENTS

| | | | |
|---|---|---|---|
| JP | 10-308227 | * 11/1998 | ............ H01M 8/02 |
| JP | 2002-100381 | 4/2002 | |
| JP | 2008-226677 | 9/2008 | |
| JP | 2008 235009 | 10/2008 | |
| JP | 2009-59513 | 3/2009 | |

OTHER PUBLICATIONS

Yan Wang, and Derek O. Northwood, An investigation into polypyrrole-coated 316L stainless steel as a bipolar plate material for PEM fuel cells, Journal of Power Sources, vol. 163, Issue 1, Nov. 7, 2006, pp. 500-508, University of Windsor, 401 Sunset Avenue, Windsor, Ontario, Canada N9B 3P4.

Yan Wang, and Derek O. Northwood, An investigation into Tin-coated 316L stainless steel as a bipolar plate material for PEM fuel cells, Journal of Power Sources, vol. 165, Issue 1, Dec. 28, 2006, pp. 293-298, University of Windsor, 401 Sunset Avenue, Windsor, Ontario, Canada N9B 3P4.

Renato A. Antunes, Mara Cristina L. Oliveira, Gerhard Ett, and Volkmar ETT, Corrosion of metal bipolar plates for PEM fuel cells: A review, International Journal of Hydrogen Energy, vol. 35, Issue 8, Feb. 13, 2010, pp. 3632-3647, Santo Andre, SP, Brazil.

Linfa Peng, Xinmin Lai, Dong'An Liu, Peng Hu, and Jun Ni, Flow channel shape optimum design for hydroformed metal bipolar plate in PEM fuel cell, Journal of Power Sources, vol. 178, Issue 1, Dec. 23, 2007, pp. 223-230, Shanghai Jiao Tong University, Shanghai 200240, China, and University of Michigan, Ann Arbor, MI 48109, USA.

H. Tawfik, Y. Hung, D. Mahajan, Metal bipolar plates for PEM fuel cell—A review, Journal of Power Sources, vol. 163, Issue 2, Nov. 20, 2006, pp. 755-767, NY, USA.

Japanese Office Action for Application No. 2011-289423, dated Apr. 23, 2013.

* cited by examiner

FLUID FLOW PLATE ASSEMBLIES FOR USE IN FUEL CELLS HAVING FLOW CHANNELS WITH SUBSTANTIALLY SAME LENGTH

RELATED APPLICATIONS

This application is based upon and claims the benefit of priority from U.S. Provisional Application No. 61/428,969, filed Dec. 31, 2010.

TECHNICAL FIELD

This application relates generally to fluid flow plate assemblies and fuel cell devices having fluid flow plate assemblies.

BACKGROUND

Fluid flow plates are structures for fluid-related applications, such as for carrying, delivering, dividing, and/or distributing one or more types of fluids. The term "fluid" is used here in a broad sense, which can be anything that is capable of flowing from one point to another. For example, a fluid may include air, gas, liquid, viscous fluid, etc., each of which is capable of flowing or moving itself or a part of it from one point to another.

Figure 1:
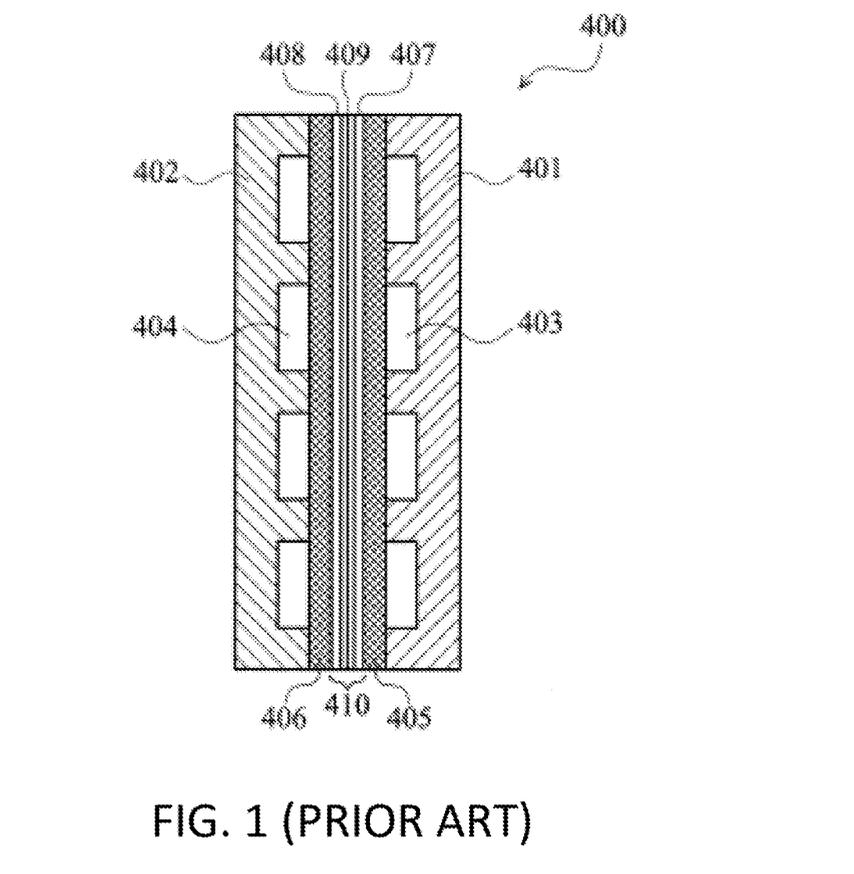
FIG. 1 illustrates a sectional view of an exemplary fuel cell device in the prior art.

As an illustrative example, one of the many applications for fluid flow plates is for fuel cells, in which fluid flow plates may be used to transport, guide, and/or distribute one or more kinds of "fuel", which may be in a liquid or gaseous form, for generating electric power. FIG. 1 illustrates a sectional view of an exemplary fuel cell device in the prior art. Referring to FIG. 1, a fuel cell 400, such as a Proton Exchange Membrane Fuel Cell (also known as "PEMFC"), may include a membrane and electrode assembly 410, two gas diffusion layers 405 and 406, and two fluid flow plates 401 and 402. As illustrated, the two gas diffusion layers 405 and 406 may sandwich between them the membrane and electrode assembly 410, and the two fluid flow plates 401 and 402 may sandwich between them both the membrane and electrode assembly 410 and the two gas diffusion layers 405 and 406. The fluid flow plates 401 and 402 each may provide one or more flow channels, such as flow channels 403 and 404, and a reactant fluid may flow through each of the flow channels. As an example, the membrane and electrode assembly 410 may include a proton exchange membrane 409, an anode catalyst layer 407, and a cathode catalyst layer 408. The anode and cathode catalyst layers 407 and 408 each may include platinum or platinum alloy, which may serve as a catalyst and facilitate electrochemical fuel cell reactions.

To facilitate the efficiency or ease of fluid distribution or that of an accompanying components, such as a fuel cell device, it may be desirable to provide fluid flow plates that may increase the ease of flow movement or distribution, decrease flow resistance, simplify system or component design, or provide different fluid flow characteristics.

SUMMARY

Consistent with the disclosed embodiments, a fluid flow plate for fuel cells may include a first surface and a second surface. The first surface may have a first fluid inlet for receiving a first fluid, a plurality of first flow channels extending substantially along a first direction for transporting the first fluid, and a first fluid outlet for releasing the first fluid. The second surface may have a second fluid inlet for receiving a second fluid, a plurality of second flow channels extending substantially along the first direction for transporting the second fluid, and a second fluid outlet for releasing the second fluid. The first fluid inlet and the second fluid outlet each is located near a first side of the fluid flow plate and the first fluid outlet and second fluid inlet each is located near a second side of the fluid flow plate. The second side of the fluid flow plate is opposite to its first side. Each of the first and second flow channels may have substantially the same length.

Also, consistent with the disclosed embodiments, a fuel cell may include a membrane and electrode assembly, a first fluid flow plate, and a second fluid flow plate. The first fluid flow plate may include a first surface and a second surface. The first surface may have a first fluid inlet for receiving a first fluid, a plurality of first flow channels extending substantially along a first direction for transporting the first fluid, and a first fluid outlet for releasing the first fluid. The second surface may have a second fluid inlet for receiving a second fluid, a plurality of second flow channels extending substantially along the first direction for transporting the second fluid, and a second fluid outlet for releasing the second fluid. The second fluid flow plate may include a third surface and a fourth surface. The third surface may have a third fluid inlet for receiving a third fluid, a plurality of third flow channels extending substantially along a second direction for transporting the third fluid, and a third fluid outlet for releasing the third fluid. The fourth surface may have a fourth fluid inlet for receiving a fourth fluid, a plurality of fourth flow channels extending substantially along the second direction for transporting the fourth fluid, and a fourth fluid outlet for releasing the fourth fluid. Each of the first, second, third, and fourth flow channels may have substantially the same length.

Still consistent with the disclosed embodiments, there is provided a fluid flow plate assembly for a fuel cell device. The fluid flow plate assembly may include a first fluid flow plate and a second fluid flow plate. The first fluid flow plate may further include a first surface and a second surface. The first surface may have a first fluid inlet for receiving a first fluid, a plurality of first flow channels extending substantially along a first direction for transporting the first fluid, and a first fluid outlet for releasing the first fluid. The second surface may have a second fluid inlet for receiving a second fluid, a plurality of second flow channels extending substantially along the first direction for transporting the second fluid, and a second fluid outlet for releasing the second fluid. The second fluid flow plate may further include a third surface and a fourth surface. The third surface may have a third fluid inlet for receiving a third fluid, a plurality of third flow channels extending substantially along a second direction for transporting the third fluid, and a third fluid outlet for releasing the third fluid. The fourth surface may have a fourth fluid inlet for receiving a fourth fluid, a plurality of fourth flow channels extending substantially along the second direction for transporting the fourth fluid, and a fourth fluid outlet for releasing the fourth fluid. Each of the first, second, third, and fourth flow channels may have substantially the same length.

It is to be understood that both the foregoing general description and the following detailed description are exemplary and explanatory and are not restrictive of the subject matter as claimed.

BRIEF DESCRIPTION OF THE DRAWINGS

The accompanying drawings, which are incorporated in and constitute a part of this specification, serve to explain the objects, advantages, and principles of the disclosed embodiments. In the drawings.

DESCRIPTION OF THE EMBODIMENTS

Reference may now be made in detail to the present embodiments, examples of which are illustrated in the accompanying drawings. Wherever possible, the same reference numbers may be used throughout the drawings to refer to the same or like parts.

A fuel cell is an electrochemical energy conversion device which converts chemical energy to electrical energy. A fuel cell may be more efficient than a conventional internal combustion engine in converting fuel to power. As an example, a fuel cell may use hydrogen as fuel and oxygen as an oxidant to generate electricity, with the byproducts of water and heat. The fuel (hydrogen), oxidant (oxygen), and byproducts (water and heat) of the fuel cell produce little, if any, pollution, when compared with most other power sources. If electric, hybrid, or other vehicles are powered by this kind of fuel cells, greenhouse gases emission and gas consumption may be greatly reduced. Therefore, fuel cells are considered as a type of "green power," i.e., a source of power that is greener than many other traditional sources of power or electricity, and the fuel cell technology is a type of "green technology."

Figure 2:
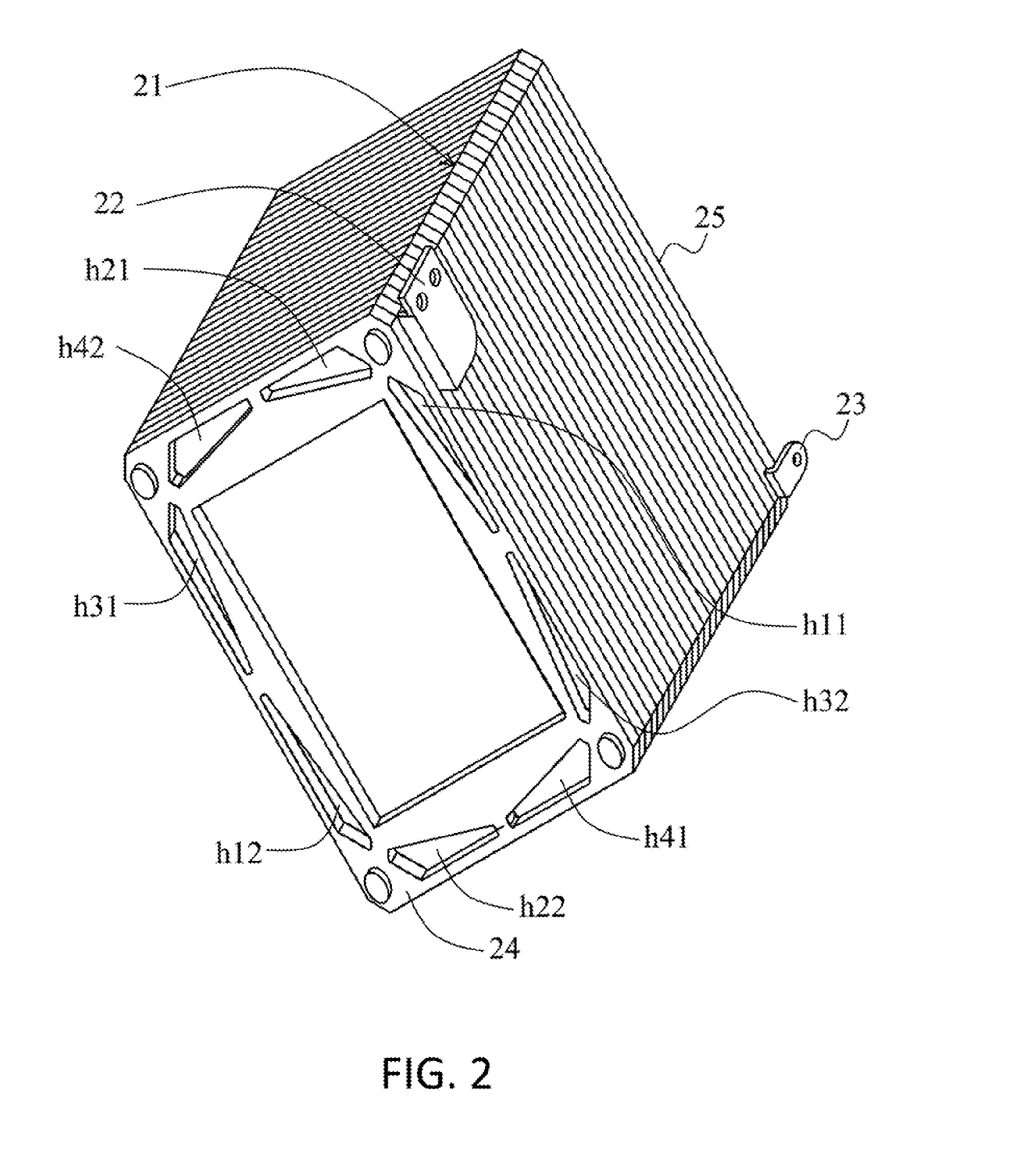
FIG. 2 illustrates a perspective view of an exemplary fuel cell device consistent with disclosed embodiments.

FIG. 2 illustrates a perspective view of an exemplary fuel cell device consistent with disclosed embodiments. A fuel cell device 2 may include a battery core 21, two electrodes 22 and 23, and two protective covers 24 and 25. In the illustrated example, the electrodes 22 and 23 may be respectively disposed on two opposite sides of the battery core 21, with each electrode coupled to the one or more cathodes or the one or more anodes of fuel cell device 2. Protective covers 24, 25 may be disposed on two opposite and outer sides of the battery core 21 to protect and secure the battery core 21 and the electrodes 22 and 23.

Figure 3:
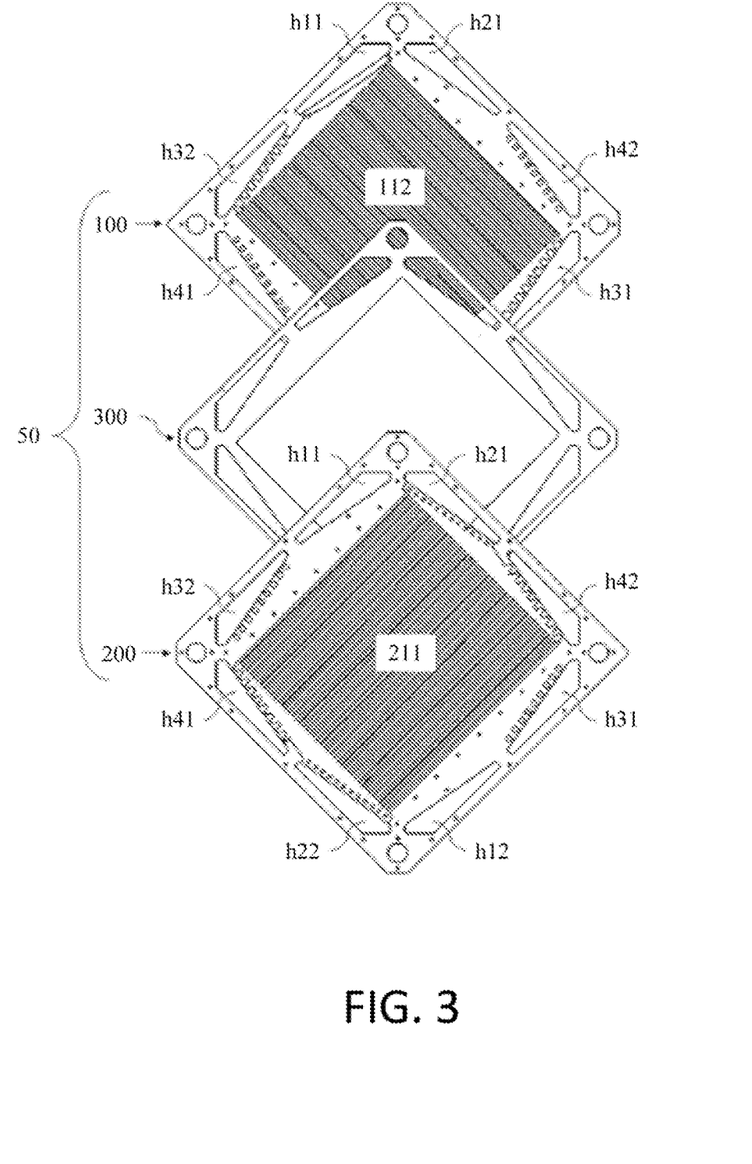
FIG. 3 illustrates a partial exploded view of one exemplary fuel cell in a fuel cell device consistent with disclosed embodiments.

FIG. 3 illustrates a partial exploded view of one exemplary fuel cell in a fuel cell device consistent with disclosed embodiments. The battery core 21 may include a number of, such as 10 to 20 or more fuel cells, each of which may have a configuration that is the same as or similar to the fuel cell 50. In one embodiment, the fuel cell 50 may include a first fluid flow plate 100, a second fluid flow plate 200, and a membrane and electrode assembly 300. The first fluid flow plate 100, second fluid flow plate 200, and membrane and electrode assembly 300 may be placed in parallel and stacked each other. The membrane and electrode assembly 300 may be a plate structure having a proton exchange membrane, an anode catalyst layer, and a cathode catalyst layer.

In one embodiment, the first fluid flow plate 100 and the second fluid flow plate 200 may be metal plates, which can be formed by stamping, pressing, or other formation techniques. The first fluid flow plate 100 and the second fluid flow plate 200 may be respectively arranged on the two opposite sides of the membrane and electrode assembly 300 to form one fuel cell 50. The battery core 50 may be formed by stacking a plurality of fuel cells.

The fluid flow plates 100 and 200 form a part of the fuel cell 50 for providing "flow field" of fluids and coolants employed by the fuel cell 50. As described in greater detailed below, in the disclosed embodiments, the fluid flow plates 100 and 200 may comprise a plurality of fluid channels (such as a first fluid channel 112 of the first fluid flow plate 100 shown in FIG. 3) for transporting a fluid from the point at which it enters the fuel cell 50 to the point at which the fluid is released from the fuel cell 50. The flow field pattern of the fluid within the fuel cell 50 may affect the distribution of the fluid across the active area of the membrane and electrode assembly 300 of the fuel cell 50. When the fluid is evenly distributed across the active area of the membrane and electrode assembly 300, the fuel cell 50 may generate electric power more effectively, depending on the designs, applications, fuels, etc. Moreover, in the disclosed embodiments, the fluid flow plates 100 and 200 may further comprise a plurality of coolant channels (such as a second coolant channel 211 of the second fluid flow plate 200 shown in FIG. 3) for transporting a coolant from the point at which it enters the fuel cell 50 to the point at which the coolant is released from the fuel cell 50. The flow field pattern of the coolant within the fuel cell 50 may affect the cooling of the fuel cell 50.

In the disclosed embodiments, the fuel cell device 2 may have a plurality of inlets for various fluids, such as a first fluid inlet h11, a second fluid inlet h21, a first coolant inlet h31, and a second coolant inlet h41, and a plurality of outlets for those fluids, such as a first fluid outlet h12, a second fluid outlet h22, a first coolant outlet h32, and a second coolant outlet h42. The inlets and outlets may pass laterally through the battery core 21 and the protective covers 24, 25. In other words, each of the first fluid flow plate 100, the second fluid flow plate 200 and the membrane and electrode assembly 300 may have the aforesaid inlets and outlets thereon as shown in FIG. 3.

In the illustrated embodiment, a first fluid may enter into the fuel cell device 50 through the first fluid inlet h11 of the first fluid flow plate 100. A second fluid may enter into the fuel cell device 50 through the second fluid inlet h21 of the second fluid flow plate 200. The first fluid, after entering into the fuel cell device 50, may be transported through first fluid channels 130 of the first fluid flow plate 100 to the membrane and electrode assembly 300. The second fluid, after entering into the fuel cell device 50, may be transported through second fluid channels 230 of the second fluid flow plate 200 to the membrane and electrode assembly 300. The first fluid and the second fluid generates may generate electric power by chemical reaction in the membrane and electrode assembly 300. The reaction generates power output in the form of output voltage and current through electrodes 22 and 23, while the not-fully-reacted first and second fluids, along with the by-product of the reaction, may be respectively discharged through the first fluid outlet h12 and the second fluid outlet h22.

In addition, a first coolant may enter into the fuel cell device 50 through the first coolant inlet h31 of the first fluid flow plate 100. A second coolant may enter into the fuel cell device 50 through the second coolant inlet h41 of the second fluid flow plate 200. The first coolant, after entering into the fuel cell device 50, may be transported through first coolant channels of the first fluid flow plate 100 to the second fluid flow plate 200. The second coolant, after entering into the fuel cell device 50, may be transported through second coolant channels of the second fluid flow plate 200 to the first fluid flow plate 100. Then, the first coolant and the second coolant may be respectively discharged through the first coolant outlet h32 and the second coolant outlet h42.

In one embodiment, the first fluid may be an oxidant, e.g., oxygen or air, while the second fluid may be a fuel, e.g., hydrogen. In another embodiment, the first fluid may be a fuel, e.g., hydrogen, while the second fluid may be an oxidant, e.g., oxygen or air. In this embodiment, electric power is generated by reacting hydrogen with oxygen, such as through an oxidation-reduction reaction. The by-product of the reaction is water. Also, the first coolant and the second coolant may be water or a type of fluid that may facilitate the cooling or the heat exchange process. It should be noted that the first fluid, second fluid, first coolant, second coolant may use different fluid depending on the designs and applications of the fuel cell system or other considerations and may use fluids different from the exemplary fluids in the disclosed embodiments.

The fuel cell devices are known as sources of green power or clean energy sources, because those devices generate electric power by consuming clean energy resources such as hydrogen and/or oxygen with little, if any, pollution. Moreover, the by-product of the power generation reaction as well as the coolant used by the fuel cell devices are water, another resource providing no or little pollution.

Figure 4:
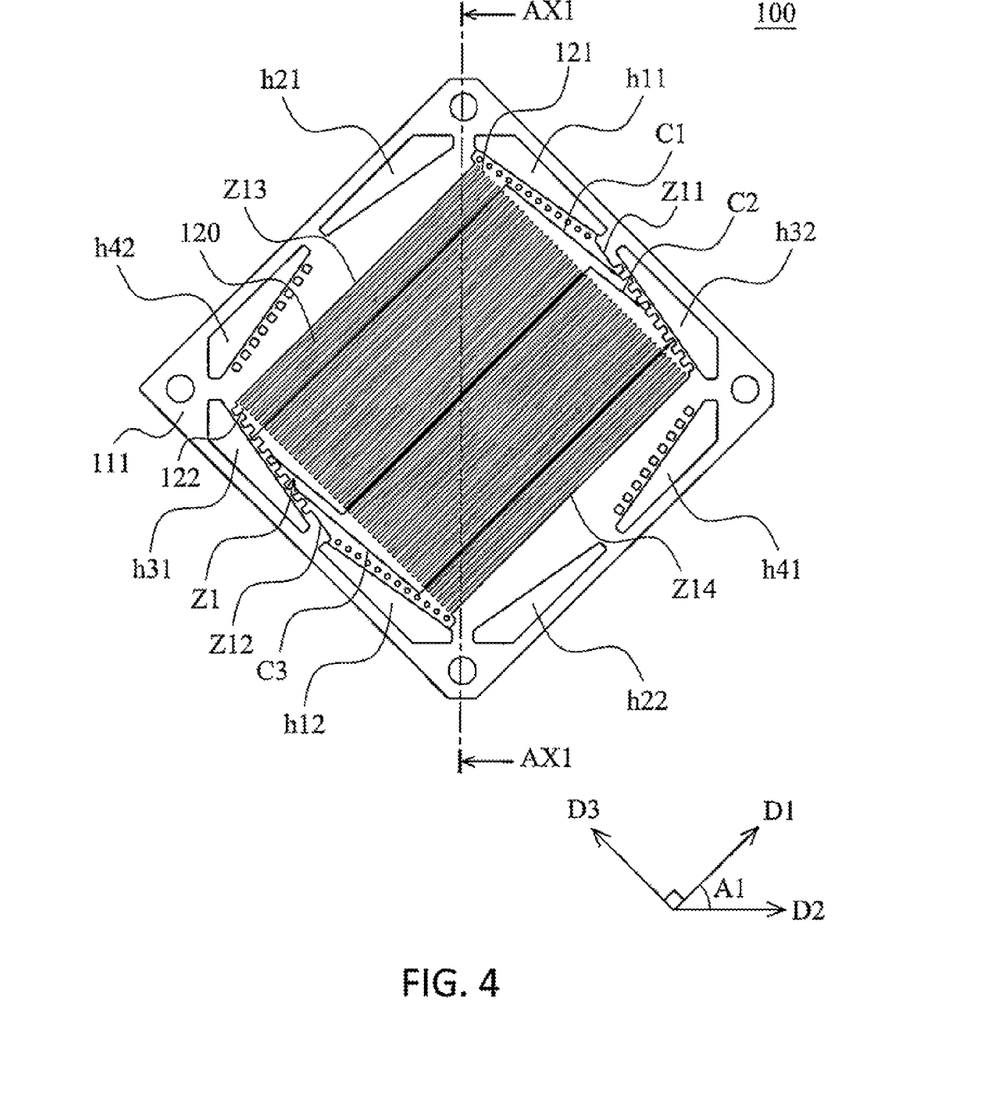
FIG. 4 illustrates a front view of an exemplary first fluid flow plate consistent with disclosed embodiments.
Figure 5:
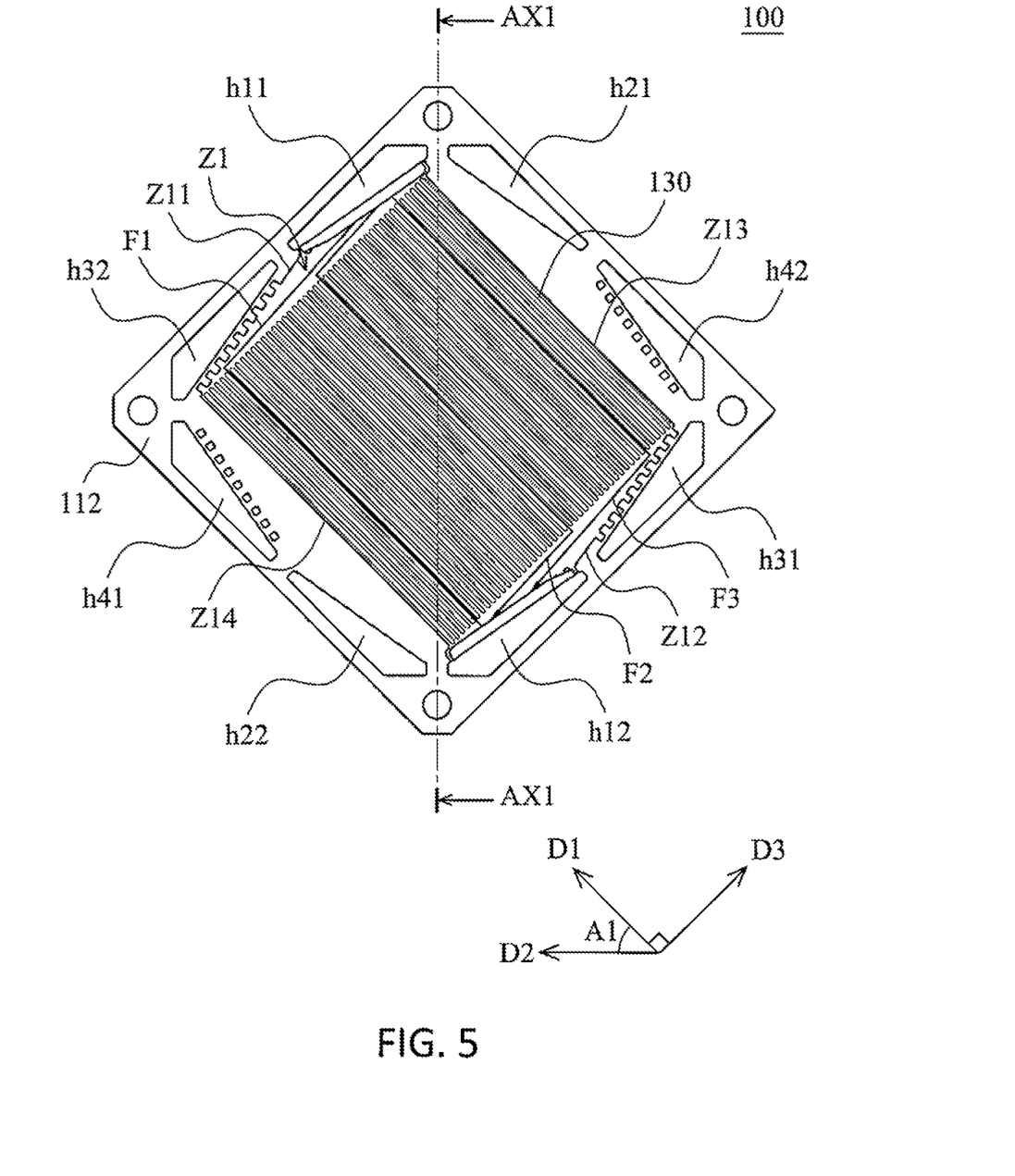
FIG. 5 illustrates a rear view of an exemplary first fluid flow plate consistent with disclosed embodiments.

FIG. 4 illustrates a front view of an exemplary first fluid flow plate consistent with disclosed embodiments. In this embodiment, a first fluid flow plate 100 may be a plate structure which may further include a first cooling surface 111 (as shown in FIG. 4) and a first reaction surface 112 (as shown in FIG. 5) respectively disposed on two opposite sides of the first fluid flow plate 100. Both the first cooling surface 111 and the first reaction surface 112 may include a first flow channel area Z1. The first flow channel area Z1 may further include a first side Z11, a second side Z12, a third side Z13 and a fourth side Z14. The first side Z11 and the second side Z12 may be oppositely disposed and the third side Z13 and the fourth side Z14 may be oppositely disposed. Both the first side Z11 and the second side Z12 may be adjacent to both the third side Z13 and the fourth side Z14.

On the first coolant surface 111 of the first fluid flow plate 100, the first coolant channels 120 may be disposed in the first flow channel area Z1 and spaced apart by ribs arranged in parallel. The first coolant channels 120 may respectively extend linearly along a first direction D1 as shown in FIG. 4. In this embodiment, the first coolant channels 120 extending along the first direction D1 may form an angle A1 with the ground surface (extending along a horizontal direction D2). The angle A1 may be in a range between 0 degree and 180 degrees. In this embodiment, the angle A1 may be 45 degrees. Each first coolant channel 120 may include a first end 121 disposed near the first side Z11 and a second end 122 disposed near the second side Z12. The first end 121 may be opposite to the second end 122.

As shown in FIG. 4, on the first cooling surface 111 of the first fluid flow plate 100, a first fluid inlet h11 may be disposed along the first side Z11 and is adjacent to the third side Z13. The second fluid inlet h21 may be disposed along the third side Z13 and is adjacent to the first side Z11. The first coolant inlet h31 may be disposed along the second side Z12 and is adjacent to the third side Z13. The second coolant inlet h41 may be disposed along the fourth side Z14 and is adjacent to the first side Z11.

Further, the first fluid outlet h12 may be disposed along the second side Z12 and is adjacent to the fourth side Z14. The second fluid outlet h22 may be disposed along the fourth side Z14 and is adjacent to the second side Z12. The first coolant outlet h32 may be disposed along the first side Z11 and is adjacent to the fourth side Z14. The second coolant outlet h42 may be disposed along the third side Z13 and is adjacent to the second side Z12.

In other words, both the first fluid inlet h11 and the first coolant outlet h32 may be disposed along the first side Z11; both the first coolant inlet h31 and the first fluid outlet h12 may be disposed along the second side Z12; both the second fluid inlet h21 and the second coolant outlet h42 may be disposed along the third side Z13; and both the second coolant inlet h41 and the second fluid outlet h22 may be disposed along the fourth side Z14. Therefore, each of the first, second, third, and fourth sides of the first flow channel area Z1 on the first coolant surface 111 of the first fluid flow plate 100 may include an fluid/coolant inlet and an fluid/coolant outlet.

FIG. 5 illustrates a rear view of an exemplary first fluid flow plate consistent with disclosed embodiments. In this embodiment, on the first reaction surface 112 of the first fluid flow plate 100, the first flow channel area Z1 is disposed corresponding to the one on the first coolant surface 111 of the first fluid flow plate 100 (as shown in FIG. 4). On the first reaction surface 112 of the first fluid flow plate 100, the first fluid channels 130 may be disposed in the flow channel area Z1 and spaced apart by ribs arranged in parallel. In the disclosed embodiments, the first fluid flow plate 100 is formed by stamping. Therefore, when a concave channel is formed on the first cooling surface 111 by stamping, a convex rib will be formed on the corresponding position of the first reaction surface 112 of the first fluid flow plate 100. Conversely, when a convex rib is formed on the first cooling surface 111 by stamping, a concave channel will be formed on the corresponding position of the first reaction surface 112 of the first fluid flow plate 100. Therefore, during the stamping, both the first coolant channels 120 and the first fluid channels 130 may be formed simultaneously. Moreover, both the first coolant channels 120 and the first fluid channels 130 may be arranged linearly along the first direction D1. The first direction D1 may form the angle A1 with the ground surface (extending along the horizontal direction D2). The angle A1 may be in a range between 0 degree and 180 degrees. In this embodiment, the angle A1 may be 45 degrees.

The relative positions of aforesaid fluid inlets and outlets disposed on the first reaction surface 112 of the first fluid flow plate 100 are comparable to their arrangements on the first cooling surface 111 shown in FIG. 4 and hence will not be elaborated.

Figure 6:
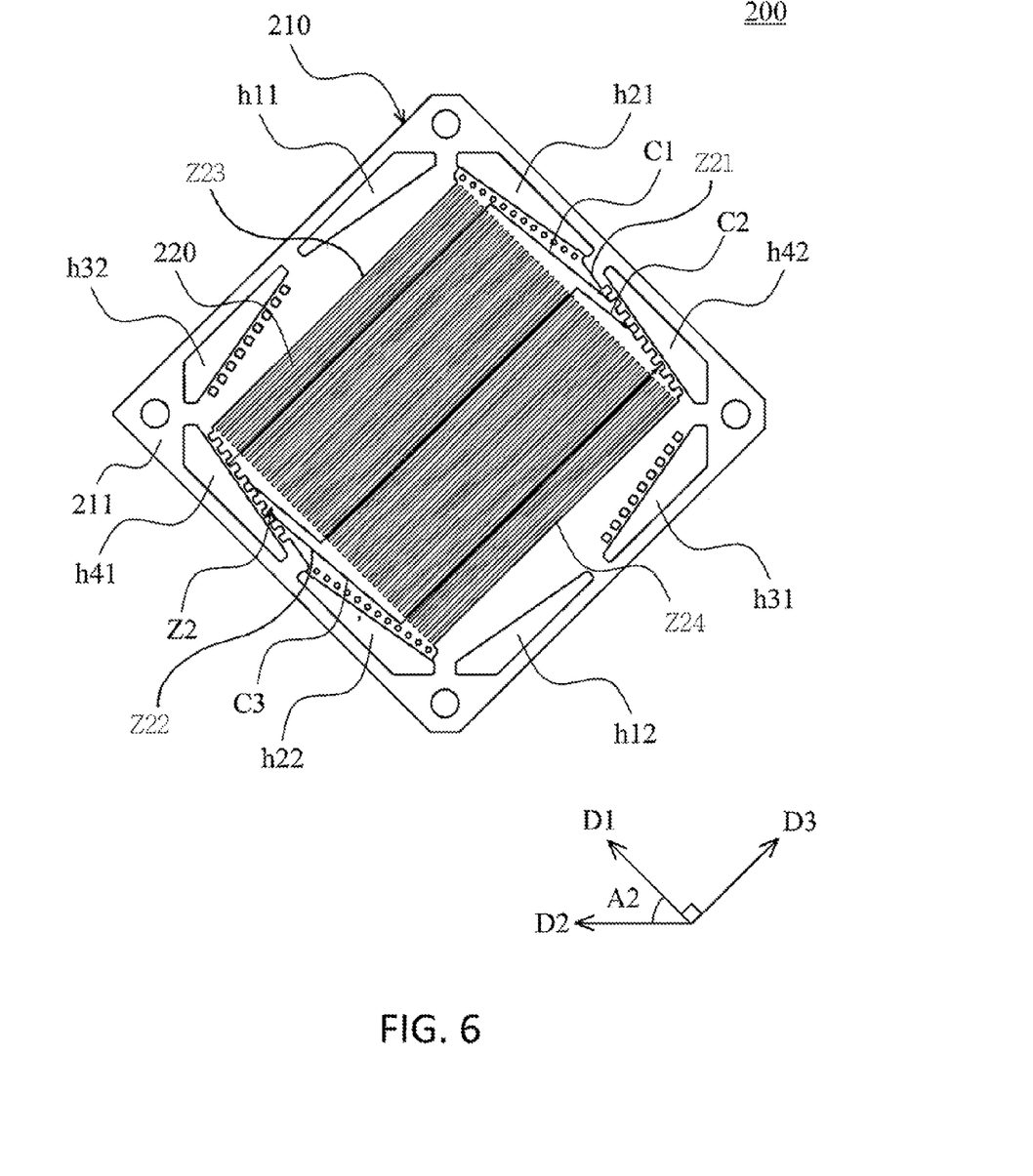
FIG. 6 illustrates a rear view of an exemplary second fluid flow plate consistent with disclosed embodiments.

FIG. 6 illustrates a rear view of an exemplary second fluid flow plate consistent with disclosed embodiments. In this embodiment, the second fluid flow plate 200 may have a similar structure with that of the first fluid flow plate 100. Referring to FIG. 5 and FIG. 6, the second fluid flow plate 200 may be the formed by overturning the first fluid flow plate 100 by 180 degrees along an axis AX1, wherein the axis AX1 may overlap the diagonal line of the first fluid flow plate 100. Therefore, in this embodiment, the second cooling surface 211 of the second fluid flow plate 200 may further include a second coolant channels 220 disposed on the second flow channel area Z2 and extending along a second direction D3. The second coolant channels 220 (extending along the second direction D3) may form an angle A2 with the ground surface (extending along the horizontal direction D2). The angle A2 may be in a range between 0 degree and 180 degrees. In this embodiment, the angle A2 may be 45 degrees.

Figure 7:
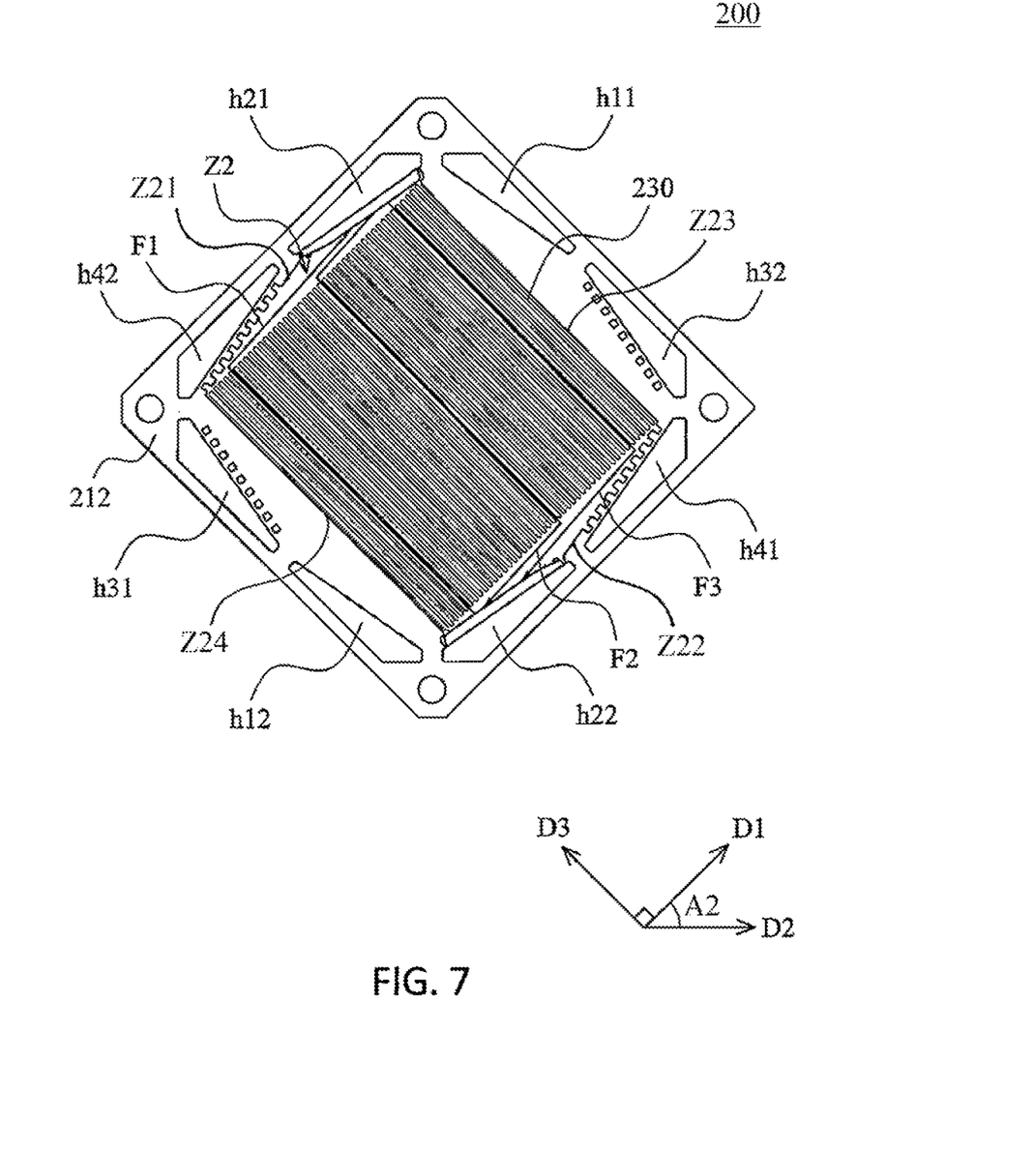
FIG. 7 illustrates a front view of the exemplary second fluid flow plate consistent with disclosed embodiments.

In this embodiment, a second fluid flow plate 200 may have a plate structure which may further include a second cooling surface 211 (as shown in FIG. 6) and a second reaction surface 212 (as shown in FIG. 7) respectively disposed on two opposite sides of the second fluid flow plate 200. Both the second cooling surface 211 and the second reaction surface 212 may include a second flow channel area Z2. The second flow channel area Z2 may further include a first side Z21, a second side Z22, a third side Z23 and a fourth side Z24. The first side Z21 and the second side Z22 may be oppositely disposed and the third side Z23 and the fourth side Z24 may be oppositely disposed. Both the first side Z21 and the second side Z22 may be adjacent to both the third side Z23 and the fourth side Z24.

As shown in FIG. 6, on the second cooling surface 211 of the second fluid flow plate 200, a first fluid inlet h11 may be disposed along the third side Z23 and is adjacent to the first side Z21. The second fluid inlet h21 may be disposed along the first side Z21 and is adjacent to the third side Z23. The first coolant inlet h31 may be disposed along the fourth side Z24 and is adjacent to the first side Z21. The second coolant inlet h41 may be disposed along the second side Z22 and is adjacent to the third side Z23.

Further, the first fluid outlet h12 may be disposed along the fourth side Z24 and is adjacent to the first side Z21. The second fluid outlet h22 may be disposed along the second side Z22 and is adjacent to the third side Z23. The first coolant outlet h32 may be disposed along the third side Z23 and is adjacent to the first side Z21. The second coolant outlet h42 may be disposed along the first side Z21 and is adjacent to the third side Z23.

In other words, both the first fluid inlet h11 and the first coolant outlet h32 may be disposed along the third side Z23; both the first coolant inlet h31 and the first fluid outlet h12 may be disposed along the fourth side Z24; both the second fluid inlet h21 and the second coolant outlet h42 may be disposed along the first side Z21; and both the second coolant inlet h41 and the second fluid outlet h22 may be disposed along the second side Z22. Therefore, each of the first, second, third, and fourth sides of the second flow channel area Z2 on the second coolant surface 211 of the second fluid flow plate 200 may include an fluid/coolant inlet and an fluid/coolant outlet.

Referring again to FIG. 4, as described earlier, the first cooling surface 111 of the first fluid flow plate 100 may include the first coolant channels 120 disposed on the first flow channel area Z1 and extending along the first direction D1. Referring to FIG. 6, the second cooling surface 211 of the second fluid flow plate 200 may include the second coolant channels 220 disposed on the second flow channel area Z2 and extending along the second direction D3. In this embodiment, the first direction D1 may have an angle with, such as being perpendicular or substantially perpendicular to, the second direction D3. As described above, the first coolant channels 120 may be used for transporting the first coolant and the second coolant channels 220 may be used for transporting the second coolant. Therefore, in this embodiment, the flow of the first coolant in the first fluid flow plate 100 (as indicated as C1, C2, and C3 in FIG. 4) may have an angle with, such as being perpendicular or substantially perpendicular to, the flow of the second coolant in the second fluid flow plate 200 (as indicated as C1, C2, and C3 in FIG. 6).

FIG. 7 illustrates a front view of an exemplary second fluid flow plate consistent with disclosed embodiments. In this embodiment, the second reaction surface 212 of the second fluid flow plate 200 may include second fluid channels 230 disposed on the second flow channel area Z2 and extending along the second direction D3. The second fluid channels 230 (extending along the second direction D3) may form the angle A2 with the ground surface (extending along in the horizontal direction D2). The angle A2 may be in a range between 0 degree and 180 degrees. In this embodiment, the angle A2 may be 45 degrees.

Referring to FIG. 5, as described earlier, the first reaction surface 112 of the first fluid flow plate 100 may include the first fluid channels 130 disposed on the first flow channel area Z1 and extending along the first direction D1. Referring to FIG. 7, the second reaction surface 212 of the second fluid flow plate 200 may include the second fluid channels 230 disposed on the second flow channel area Z2 and extending along the second direction D3. In this embodiment, the first direction D1 may have an angle with, such as being perpendicular or substantially perpendicular to, the second direction D3. As described above, the first fluid channels 130 may be used for transporting the first fluid and the second fluid channels 230 may be used for transporting the second fluid. Therefore, in this embodiment, the flow of the first fluid in the first fluid flow plate 100 (as indicated as F1, F2, and F3 in FIG. 5) may have an angle with, such as being perpendicular or substantially perpendicular to, the flow of the second fluid in the second fluid flow plate 200 (as indicated as F1, F2, and F3 in FIG. 7).

Referring to FIG. 2 and FIG. 3, when the first fluid flow plate 100, the second fluid flow plate 200 and the membrane and electrode assembly 300 may be assembled into the battery core 21 where the first coolant inlet h31, the first coolant outlet h32 and the first coolant channels 120 may be interconnected. In addition, the first coolant channels 120 and the second coolant channels 220 may be interconnected, but they may not be interconnected with the first fluid channels 130 or the second fluid channels 230. Therefore, the first coolant may flow into the first coolant channels 120 and/or the second coolant channels 220 through the first coolant inlet h31, and later may be discharged through the first coolant outlet h32. As shown in FIG. 4, the coolant flow paths C1, C2, C3 in the first fluid flow plate 100 for the flow of the first coolant may be approximately of the same length.

Similarly, the second coolant inlet h41, the second coolant outlet h42 and the second coolant channels 220 may be interconnected. In addition, the first coolant channels 120 and the second coolant channels 220 may be interconnected, but they may not be interconnected with the first fluid channels 130 or the second fluid channels 230. Therefore, the second coolant may flow into the second coolant channels 220 through the second coolant inlet h41, and later, may be discharged from the first coolant channels 120 and/or the second coolant channels 220. As shown in FIG. 6, the coolant flow paths C1, C2, C3 in the second fluid flow plate 200 for transporting the second coolant may be approximately of the same length.

Also, the first fluid inlet h11 and the first fluid outlet h12 may be interconnected with the first fluid channels 130 such that the second fluid or the second coolant may not enter the first fluid channels 130. Therefore, the first fluid may flow into the first fluid channels 130 of the first fluid flow plate 100 through the first fluid inlet h11 and later, may be discharged through the first fluid outlet h12. As shown in FIG. 5, the fluid flow paths F1, F2, F3 in the first fluid flow plate 100 for transporting the first fluid are approximately of the same length.

Further, the second fluid inlet h21 and the second fluid outlet h22 may be interconnected with the second fluid channels 230 such that the first fluid or the first coolant may not enter the second fluid channels 230. Therefore, the second fluid may flow into the second fluid channels 230 of the second fluid flow plate 200 through the second fluid inlet h21 and later, be discharged through the second fluid outlet h22. As shown in FIG. 7, the fluid flow paths F1, F2, F3 in the second fluid flow plate 200 for transporting the second fluid are approximately of the same length.

Figure 8:
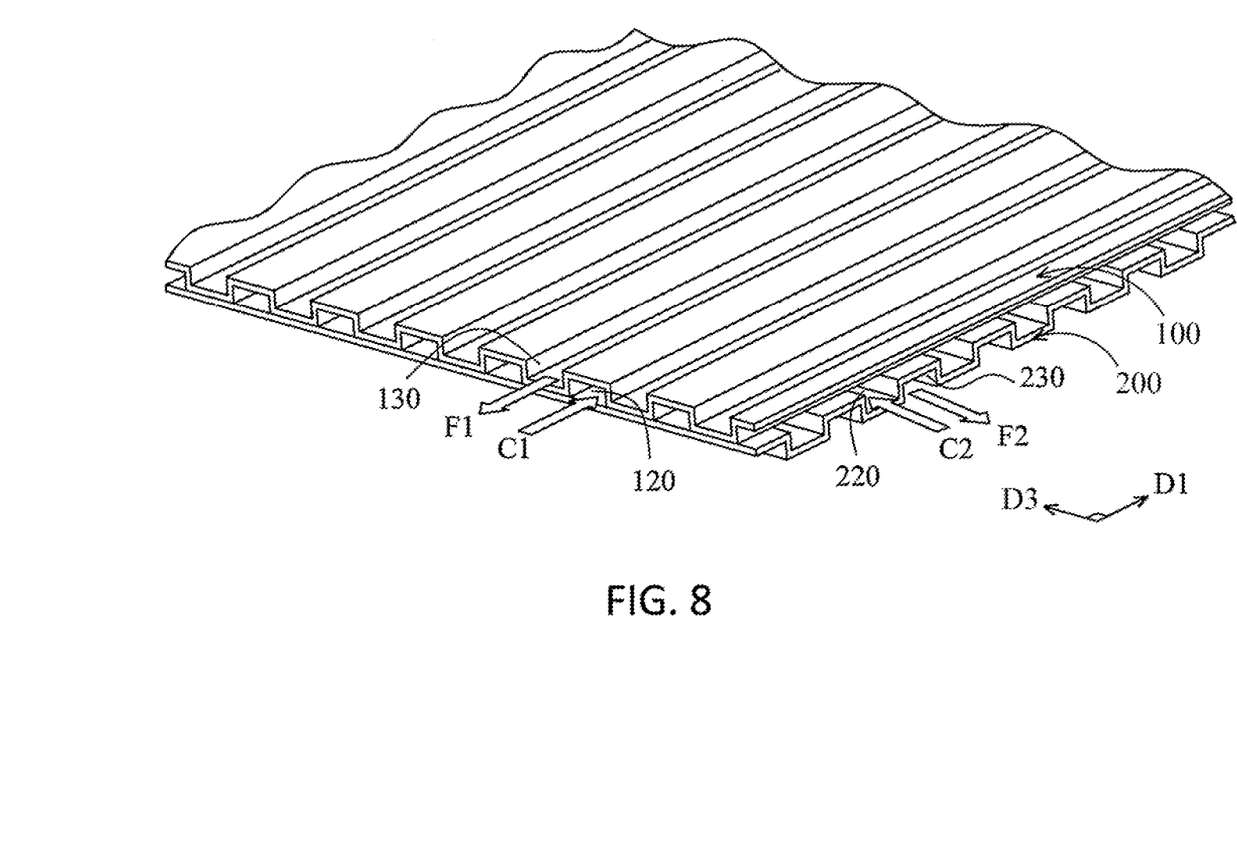
FIG. 8 illustrates a partial view of an exemplary fluid flow plate assembly consistent with disclosed embodiments.

FIG. 8 illustrates a partial view of an exemplary fluid flow plate assembly consistent with disclosed embodiments. The battery core may include a plurality of stacked fuel cells as illustrated in FIG. 2. In this embodiment, the first fluid flow plate 100 of a first fuel cell may be assembled with the second fluid flow plate 200 of a second fuel cell adjacent to the first fuel cell. In FIG. 8, the first coolant channels 120 on the first fluid flow plate 100 of the first fuel cell may be interconnected with the second coolant channels 220 on the second fluid flow plate 200 of the second fuel cell. The first coolant channels 120 may extend along the first direction D1 and the second coolant channels 220 may extend along the second direction D3. In this embodiment, the first direction D1 may have an angle with, such as being perpendicular or substantially perpendicular to, the second direction D3. Therefore, the first coolant channels 120 and the second coolant channels 220 may be arranged in a substantially X-shaped configuration such that the first coolant channels 120 may have an angle with, such as being perpendicular or substantially perpendicular to, the second coolant channels 220. The first coolant may flow linearly in the first coolant channels 120 (as shown by arrow C1), while the second coolant may also flow linearly in the second coolant channels 220 (as shown by arrow C2). As such, both the first coolant and the second coolant may have little flow resistance when being respectively transported in the first fluid flow plate 100 and the second fluid flow plate 200. Similarly, the first fluid channels 130 may extend along the first direction D1 and the second fluid channels 230 may extend along the second direction D3. Since the first direction D1 may have an angle with, such as being perpendicular or substantially perpendicular to, the second direction D3 in this embodiment, the first fluid channels 130 and the second fluid channels 230 may be arranged in a substantially X-shaped configuration such that the first fluid channels 130 may be perpendicular to the second fluid channels 230. The first fluid can flow linearly in the first fluid channels 130 (as shown by arrow F1), while the second fluid can also flow linearly in the second fluid channels 230 (as shown by arrow F2). As such, both the first fluid and the second fluid may have little flow resistance when being respectively transported in the first fluid flow plate 100 and the second fluid flow plate 200.

In the above embodiments, both the coolant channels and fluid channels of the fluid flow plate may be linearly extended such that the coolants and the fluids may have less resistance when they respectively flow through the coolant channels and the fluid channels. In this manner, less power may be required by the fuel cell for transporting the first and second coolants, the first and the second fluids, and the by-product of the reaction between the first and the second fluids in the disclosed embodiments.

Furthermore, the first and second coolant channels may be formed in a substantially X-shaped configuration, as described above, such that the coolant may be more evenly distributed in the fuel cell. Therefore, the cooling function of the fuel cell employed the fluid flow plate in the disclosed embodiments may be improved.

Moreover, the first and second fluid channels may also be formed in a substantially X-shaped configuration and both the first and second fluid channels are disposed to form an inclined angle with the ground (such as 45 degrees, as described above), such that the remaining first and second fluid along with the by-product of the reaction between the first fluid and the second fluid may flow along the first and second inclined fluid channels and later, be discharged from the fuel cell.

Also, the coolant and fluid inlets and outlets and the fluid channels and coolant channels of the fluid flow plate of the disclosed embodiment may be configured such that all the paths for the fluid to flow from the fluid inlet to the fluid outlet of the fluid flow plate are substantially of the same length and all the paths for the coolant to flow from the coolant inlet to the coolant outlet of the fluid flow plate are substantially of the same length.

It will be apparent to those skilled in the art that various modifications and variations can be made in the disclosed process without departing from the scope or spirit of the disclosed embodiments. Other embodiments may be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A fluid flow plate for fuel cells, the fluid flow plate comprising:
   a reaction surface having a first fluid inlet for receiving a first fluid, a first fluid outlet for releasing the first fluid, and a plurality of discrete fluid channels, the discrete fluid channels forming a plurality of fluid flow paths of equal lengths for transporting the first fluid substantially along a first direction between the first fluid inlet and the first fluid outlet, all of the plurality of discrete fluid channels being parallel to each other;
   a cooling surface having a first coolant inlet for receiving a first coolant, a first coolant outlet for releasing the first coolant, and a plurality of discrete coolant channels, the discrete coolant channels forming a plurality of coolant flow paths of equal lengths for transporting the first coolant substantially along the first direction between the first coolant inlet and the first coolant outlet,
   wherein the first fluid inlet and the first coolant outlet are each disposed along a first side of the fluid flow plate, the first fluid outlet and first coolant inlet are each disposed along a second side of the fluid flow plate, the second side being opposite to the first side of the fluid flow plate;
   a second fluid inlet for passing a second fluid to a different fluid flow plate of the fuel cells;
   a second fluid outlet for receiving the second fluid from the different fluid flow plate;
   a second coolant inlet for passing a second coolant to the different fluid flow plate; and
   a second coolant outlet for receiving the second coolant from the different fluid flow plate, the second fluid inlet and the second coolant outlet each disposed along a third side of the fluid flow plate, the second fluid outlet and the second coolant inlet each disposed along a fourth side of the fluid flow plate, and the fourth side being opposite to the third side of the fluid flow plate.

2. The fluid flow plate of claim 1, wherein the first direction has an angle between 0 degree and 180 degrees with a ground surface.

3. The fluid flow plate of claim 1, wherein each of the first fluid and the second fluid comprises one of an oxidant and a fuel.

4. A fuel cell comprising:
   a membrane and electrode assembly;
   a first fluid flow plate, comprising:
   a first reaction surface having a first fluid inlet for receiving a first fluid, a first fluid outlet for releasing the first fluid, and a plurality of first discrete fluid channels, the first discrete fluid channels forming a plurality of fluid flow paths of equal lengths for transporting the first fluid substantially along a first direction between the first fluid inlet and the first fluid outlet, all of the plurality of first discrete fluid channels being parallel to each other;

a first cooling surface having a first coolant inlet for receiving a first coolant, a first coolant outlet for releasing the first coolant, and a plurality of first discrete coolant channels, the first discrete coolant channels forming a plurality of coolant flow paths of equal lengths for transporting the first coolant substantially along the first direction between the first coolant inlet and the first coolant outlet, wherein the first fluid inlet and the first coolant outlet of the first fluid flow plate are each disposed along a first side of the first fluid flow plate, the first fluid outlet and first coolant inlet of the first fluid flow plate are each disposed along a second side of the first fluid flow plate, the second side being opposite to the first side of the first fluid flow plate;

a second fluid inlet for passing a second fluid to a second fluid flow plate;

a second fluid outlet for receiving the second fluid from the second fluid flow plate;

a second coolant inlet for passing a second coolant to the second fluid plate; and a second coolant outlet for receiving the second coolant from the second fluid plate, the second fluid inlet and the second coolant outlet each disposed along a third side of the first fluid flow plate, the second fluid outlet and the second coolant inlet each disposed along a fourth side of the first fluid flow plate, the fourth side being opposite to the third side of the first fluid flow plate; and the second fluid flow plate, comprising:

a second cooling surface having a third coolant inlet for receiving the second coolant from the second coolant inlet of the first fluid flow plate, a third coolant outlet for releasing the second coolant to the second coolant outlet, and a plurality of second discrete coolant channels forming a plurality of coolant flow paths of equal lengths for transporting the second coolant substantially along a second direction between the third coolant inlet and the third coolant outlet; and a second reaction surface having a third fluid inlet for receiving the second fluid from the second fluid inlet of the first fluid flow plate, a third fluid outlet for releasing the second fluid to the second fluid outlet of the first fluid flow plate, and a plurality of second discrete fluid channels forming a plurality of fluid flow paths of equal lengths for transporting the second fluid substantially along the second direction between the third fluid inlet and the third fluid outlet, wherein the third fluid inlet and the third coolant outlet of the second fluid flow plate are each disposed along a first side of the second fluid flow plate, the third fluid outlet and the third coolant inlet of the second fluid flow plate are each disposed along a second side of the second fluid flow plate, the second side being opposite to the first side of the second fluid flow plate; and a fourth fluid inlet for receiving the first fluid from the first fluid flow plate;

a fourth fluid outlet for passing the first fluid to the first fluid flow plate;

a fourth coolant inlet for receiving the first coolant from the first fluid flow plate; and a fourth coolant outlet for passing the first coolant to the first fluid flow plate, the fourth fluid inlet and the fourth coolant outlet each disposed along a third side of the second fluid flow plate, the fourth fluid outlet and the fourth coolant inlet each disposed along a fourth side of the second fluid flow plate, the fourth side being opposite to the third side of the second fluid flow plate.

5. The fuel cell of claim 4, wherein each of the first direction and the second direction has an angle between 0 degree and 180 degree with a ground axis.

6. The fuel cell of claim 5, wherein the second direction is substantially perpendicular to the first direction.

7. The fuel cell of claim 4, wherein the first and second fluids each comprises one of an oxidant and a fuel.

8. A fluid flow plate assembly for a fuel cell device, comprising:

a first fluid flow plate, comprising:

a first reaction surface having a first fluid inlet for receiving a first fluid, a first fluid outlet for releasing the first fluid, and a plurality of first discrete fluid channels, the first discrete fluid channels forming a plurality of fluid flow paths of equal lengths for transporting the first fluid substantially along a first direction between the first fluid inlet and the first fluid outlet, all of the plurality of first discrete fluid channels being parallel to each other;

a first cooling surface having a first coolant inlet for receiving a first coolant, a first coolant outlet for releasing the first coolant, and a plurality of first discrete coolant channels, the first discrete coolant channels forming a plurality of coolant flow paths of equal lengths for transporting the first coolant substantially along the first direction between the first coolant inlet and the first coolant outlet;

wherein the first fluid inlet and the first coolant outlet of the first fluid flow plate are each disposed along a first side of the first fluid flow plate, the first fluid outlet and the first coolant inlet of the first fluid flow plate are each disposed along a second side of the first fluid flow plate, and the second side is opposite to the first side of the first fluid flow plate;

a second fluid inlet for passing a second fluid to a second fluid flow plate;

a second fluid outlet for receiving the second fluid from the second fluid flow plate;

a second coolant inlet for passing a second coolant to the second fluid flow plate; and a second coolant outlet for receiving the second coolant from the second fluid flow plate, the second fluid inlet and the second coolant outlet each disposed along a third side of the first fluid flow plate, the second fluid outlet and the second coolant inlet each disposed along a fourth side of the first fluid flow plate, the fourth side being opposite to the third side of the first fluid flow plate; and the second fluid flow plate, comprising:

a second cooling surface having a third coolant inlet for receiving the second coolant from the second coolant inlet of the first fluid flow plate, a third coolant outlet for releasing the second coolant to the second coolant outlet, and a plurality of second discrete coolant channels, the second discrete coolant channels forming a plurality of coolant flow paths of equal lengths for transporting the second coolant substantially along a second direction between third coolant inlet and the third coolant outlet;

a second reaction surface having a third fluid inlet for receiving the second fluid from the second fluid inlet of the first fluid flow plate, a third fluid outlet for releasing the second fluid to the second fluid outlet of the first fluid flow plate, and a plurality of second discrete fluid channels, the second discrete fluid channels forming a plurality of fluid flow paths of equal lengths for transporting the second fluid substantially along the second direction between the third fluid inlet and the third fluid outlet, wherein the third fluid inlet and the third coolant outlet of the second fluid flow plate are each disposed along a first side of the second fluid flow plate, the third fluid outlet and the third coolant inlet of the second fluid flow plate are each disposed along a second side of the second fluid flow plate, the second side being opposite to the first side of the second fluid flow plate;

a fourth fluid inlet for receiving the first fluid from the first fluid flow plate;

a fourth fluid outlet for passing the first fluid to the first fluid flow plate;

a fourth coolant inlet for receiving the first coolant from the first fluid flow plate; and a fourth coolant outlet for passing the first fluid to the first fluid flow plate, the fourth fluid inlet and the fourth coolant outlet each disposed along a third side of the second fluid flow plate, the fourth fluid outlet and the fourth coolant inlet each disposed along a fourth side of the second fluid flow plate, the fourth side being opposite to the third side of the second fluid flow plate.

9. The fluid flow plate assembly of claim 8, wherein each of the first direction and the second direction has an angle between 0 degree and 180 degree with a ground axis.

10. The fluid flow plate assembly of claim 9, wherein the second direction is substantially perpendicular to the first direction.

11. The fluid flow plate assembly of claim 8, wherein the first and second fluids each comprises one of an oxidant and a fuel.

12. The fluid flow plate assembly of claim 8, wherein the fuel cell device further includes a first fuel cell and a second fuel cell, the first fluid flow plate is located within the first fuel cell, and the second fluid plate is located within the second fuel cell.

13. The fluid flow plate assembly of claim 12, wherein the first fluid flow plate is stacked with the second fluid flow plate.

14. The fluid flow assembly of claim 13, wherein:

the first fluid inlet of the first fluid flow plate substantially overlaps the fourth fluid inlet of the second fluid flow plate, the first fluid outlet of the first fluid flow plate substantially overlaps the fourth fluid outlet of the second fluid flow plate, the first coolant inlet of the first fluid flow plate substantially overlaps the fourth coolant inlet of the second fluid flow plate, the first coolant outlet of the first fluid flow plate substantially overlaps the fourth coolant outlet of the second fluid flow plate, the second fluid inlet of the first fluid flow plate substantially overlaps the third fluid inlet of the second fluid flow plate, the second fluid outlet of the first fluid flow plate substantially overlaps the third fluid outlet of the second fluid flow plate, the second coolant inlet of the first fluid flow plates substantially overlaps the third coolant inlet of the second fluid flow plate, and the second coolant outlet of the first fluid flow plate substantially overlaps the third coolant outlet of the second fluid flow plate.

\* \* \* \* \*